(12) United States Patent
Onodera

(10) Patent No.: US 7,092,212 B2
(45) Date of Patent: Aug. 15, 2006

(54) METHOD FOR FABRICATING A THIN FILM MAGNETIC HEAD AND WAFER STRUCTURE

(75) Inventor: Ikuhito Onodera, Tokyo (JP)

(73) Assignee: TDK Corporation, Tokyo (JP)

( * ) Notice: Subject to any disclaimer, the term of this patent is extended or adjusted under 35 U.S.C. 154(b) by 547 days.

(21) Appl. No.: 10/076,653

(22) Filed: Feb. 19, 2002

(65) Prior Publication Data

US 2002/0122276 A1   Sep. 5, 2002

(30) Foreign Application Priority Data

Mar. 2, 2001 (JP) ............................. 2001-057673

(51) Int. Cl.
*G11B 5/40* (2006.01)
*G11B 5/127* (2006.01)

(52) U.S. Cl. ............................. 360/234.5; 29/603.09; 29/603.12; 29/603.15

(58) Field of Classification Search ............ 360/234.5, 360/234.4, 234.6; 451/5, 9, 11; 29/603.01, 29/603.07, 603.12, 603.15, 603.16
See application file for complete search history.

(56) References Cited

U.S. PATENT DOCUMENTS

| | | | | |
|---|---|---|---|---|
| 4,912,883 A | * | 4/1990 | Chang et al. | 451/5 |
| 5,023,991 A | * | 6/1991 | Smith | 29/603.09 |
| 5,597,340 A | * | 1/1997 | Church et al. | 29/603.16 |
| 5,911,455 A | * | 6/1999 | Draaisma et al. | 29/603.07 |
| 5,997,381 A | * | 12/1999 | Dee et al. | 29/603.16 |
| 6,195,871 B1 | * | 3/2001 | Watanuki | 29/603.09 |
| 6,370,763 B1 | * | 4/2002 | Watanuki et al. | 29/603.09 |
| 6,609,948 B1 | * | 8/2003 | Fontana et al. | 29/603.14 |
| 6,747,846 B1 | * | 6/2004 | Kato et al. | 360/234.5 |

FOREIGN PATENT DOCUMENTS

| | | | |
|---|---|---|---|
| DE | 2 262 585 | * | 12/1972 |
| JP | A 8-287424 | | 1/1996 |
| JP | A 2000-187819 | | 4/2000 |

* cited by examiner

*Primary Examiner*—Andrea Wellington
*Assistant Examiner*—Christopher R. Magee
(74) *Attorney, Agent, or Firm*—Oliff & Berridge, PLC

(57) ABSTRACT

Leading wires of an electrical circuit and a thin film magnetic head assembly are electrically connected with a conductive film. The leading wires are connected to an element pad and a circuit pad, respectively. An element bump is shared with the electrical circuit and the thin film magnetic assembly. Information of the processing degree of the thin film magnetic head assembly is electrically monitored via the element bump from a bonding pad which is electrically connected with the element bump.

18 Claims, 4 Drawing Sheets

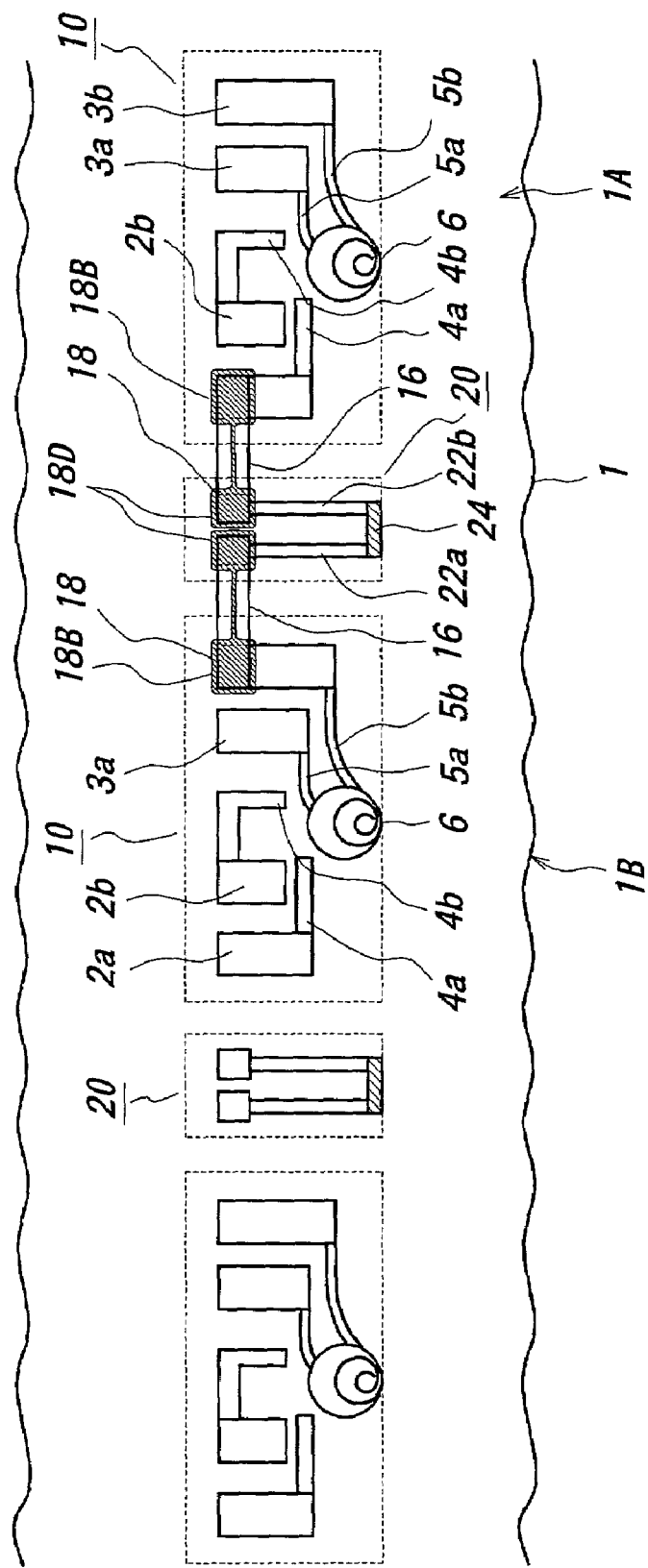

METHOD FOR FABRICATING A THIN FILM MAGNETIC HEAD AND WAFER STRUCTURE

BACKGROUND OF THE INVENTION

1. Field of the Invention

This invention relates to a method for fabricating a thin film magnetic head and a wafer structure.

2. Related Art Statement

A complete thin film magnetic head is obtained by polishing a given surface of a thin film magnetic head assembly which is fabricated on a given substrate to form an air bearing surface (ABS). In a thin film magnetic head assembly including a magnetoresistive effective type reading element, the polishing process is carried out so that the MR height is constant (the MR height is defined). Herein, the MR height is a processed length of the assembly from the end surface of the thin film magnetic head assembly.

In this case, an electrical lap-guiding element (often called as "lap-guiding element", hereinafter) is fabricated on the substrate where the thin film magnetic head assembly is fabricated, and thus, the polishing process is carried out with monitoring the size of the MR height through the electrical changes of the lap-guiding element.

FIG. 1 is a plan view showing a wafer structure in which thin film head assemblies and lap-guiding elements are fabricated on a single wafer as a substrate, and FIG. 2 is a cross sectional view of a portion of the wafer structure of FIG. 1, taken on line X—X. In FIG. 1, for simplicity, the thin film head assemblies and the lap-guiding elements are fabricated on the trailing surface 1A of the wafer 1 in a line by turns. In FIGS. 1 and 2, for clarifying the characteristics of the present invention, the detail structure of the wafer structure is different from a real one.

A thin film magnetic head assembly 10 includes element pads 2a; 2b and 3a; 3b which are exposed on the trailing surface 1A of the wafer 1. The element pads 2a and 2b are electrically connected to a MR element of the thin film magnetic head assembly 10 via leading wires 4a and 4b. The element pads 3a and 3b are electrically connected to a writing element 6 of the thin film magnetic head assembly 10 via leading wires 5a and 5b.

A lap-guiding element 20 includes circuit pads 21a and 21b, and is connected to a resistive film 24 made of the same material as that of the MR film to construct the MR element via leading wires 22a and 22b. The polishing process is carried out from the end surface 1B of the wafer 1. The polishing degree of the MR element is checked by the change in resistance of the resistive film 24, and thus, the MR height is monitored indirectly.

Practically, a protective layer 15 is formed on the trailing surface 1A so as to cover the thin film head assemblies and lap-guiding elements.

Therefore, as shown in FIG. 2, the circuit bump 27 is provided so as to penetrate the protective layer 15, and electrically connected to the leading wire 22b and the circuit pad 21b. Then, the change in resistance of the resistive film 24 is monitored through the circuit pad 21b, and the processing degree of the ABS, that is, the MR height is indirectly controlled.

Also, an element bump 7 is provided so as to penetrate the protective layer 15, and electrically connected to the leading wire 4a and the element pad 2a. The element bump 7 is electrically connected to the MR element via the leading wire 4a.

With the recent development of high recording density and small cutting space, the distance between a thin film magnetic head assembly and an electrical circuit is narrowed on a substrate on which the thin film head assembly and the electrical circuit are disposed. In FIG. 2, therefore, the distance between the circuit bump 27 and the element bump 7 is also narrowed, for example.

In this case, however, the short-circuit between the thin film magnetic head assembly 10 and the lap-guiding element 20 may occur. In addition, some cracks and chirping may be created between the circuit bump 27 and the element bump 7, and thus, some defects may be created in the resulting thin film magnetic head.

SUMMARY OF THE INVENTION

It is an object of the present invention to provide a method for fabricating a thin film magnetic head and a wafer structure to satisfy the requirements of high recording density and small cutting space.

For achieving the above objects, this invention relates to a method for fabricating a thin film magnetic head, comprising the steps of:

fabricating a thin film magnetic head assembly on a given substrate, fabricating, on said substrate, an electrical circuit including a circuit leading wire_so as to monitor the processing degree of said thin film magnetic head assembly, forming a protective layer so as to cover said thin film magnetic head assembly and said electrical circuit, fabricating, on said substrate, a bump so as to penetrate said protective layer and thus, to be exposed, fabricating, on said substrate, an element leading wire a circuit leading wire_ to be electrically connected to said thin film magnetic head assembly, and electrically connecting said element leading wire and said circuit leading wire, whereby said bump is shared with said thin film magnetic head assembly and said electrical circuit, and the processing degree of said thin film magnetic head assembly is indirectly monitored by an external monitoring system on the monitoring information from said electrical circuit to said external monitoring system via said bump.

In the fabricating method of the present invention, a circuit bump may not be fabricated in an electrical circuit area. Therefore, even through thin film magnetic head assemblies and electrical circuits for monitoring are fabricated in high density on a single wafer to satisfy the requirement of high recording density, the short-circuit between each thin film magnetic head assembly and each electrical circuit which are fabricated adjacently can be inhibited because the corresponding circuit bump and the corresponding element bump are not contacted.

Similarly, even though the space between each circuit bump and each element bump is narrowed, the creation of some cracks and chirping can be inhibited between the corresponding thin film magnetic head assembly and the corresponding electrical circuit. Therefore, the creation of defect can be inhibited in the thin film magnetic head assembly, and thus, the yielding ratio in manufacture of the resulting thin film magnetic head can be enhanced.

In the fabricating method of the present invention, it is desired that the element pad and the circuit pad are electrically connected by a conductive film which is fabricated so as to cover the pads. In this case, the element pad and the circuit pad are electrically connected surely. The conductive film is preferably made by a sputtering method or a plating method. In order to reduce the fabricating steps, the element pad, the circuit pad and the conductive film are preferably made of the same conductive material.

It is desired to fabricate, on the protective layer, a bonding pad to be electrically connected to the bump. In this case, the contact area of a monitoring instrument for the processing degree can be enlarged. The bonding pad is preferably elongated to the area of the electrical circuit on the protective layer. In this case, since the terminal of the monitoring instrument can be disposed on the elongated portion of the bonding pad, the damage of the electrode portion of the bonding pad near the bump can be inhibited. Also, the bonding pad is preferably narrowed in between the thin film magnetic head assembly and the electrical circuit. In this case, when the electrical circuit area is cut off, to complete a given thin film magnetic head, short-circuit can be inhibited in the thin film magnetic head.

In the fabricating method of the present invention, it is desired that the electrical circuit is made as an electrical lap-guiding element. Also, it is desired that the thin film magnetic head assembly includes the reading head element, and the polishing degree of the reading head element is monitored by the electrical lap-guiding element. In this case, the polishing degree of the reading element can be monitored by an external monitoring system through the electrical lap-guiding element.

This invention also relates to a wafer structure comprising:

a thin film magnetic head assembly which is fabricated on a given substrate, an electrical circuit including a circuit leading wire so as to monitor the processing degree of said thin film magnetic head assembly, which is fabricated on said substrate, a protective layer so as to cover said thin film magnetic head assembly and said electrical circuit, a bump so as to penetrate said protective layer and thus, to be exposed, which is fabricated on said substrate, and an element leading wire_to be electrically connected to said thin film magnetic head element to be connected to an external circuit, which is fabricated on said substrate said element leading wire_being electrically connected with said circuit leading wire, said bump is shared with said thin film magnetic head assembly and said electrical circuit.

In the wafer structure of the present invention, a circuit bump may not be fabricated in an electrical circuit area. Therefore, even through thin film magnetic head assemblies and electrical circuits for monitoring are fabricated in high density on a single wafer to satisfy the requirement of high recording density, the short-circuit between each thin film magnetic head assembly and each electrical circuit which are fabricated adjacently can be inhibited because the corresponding circuit bump and the corresponding element bump are not contacted.

Similarly, even though the space between each circuit bump and each element bump is narrowed, the creation of some cracks and chirping can be inhibited between the corresponding thin film magnetic head assembly and the corresponding electrical circuit. Therefore, the creation of defect can be inhibited in the thin film magnetic head assembly, and thus, the yielding ratio in manufacture of the resulting thin film magnetic head can be enhanced.

In the wafer structure of the present invention, it is desired that the element pad and the circuit pad are electrically connected by a conductive film which is fabricated so as to cover the pads. In this case, the element pad and the circuit pad are electrically connected surely. The conductive film is preferably made by a sputtering method or a plating method. In order to reduce the fabricating steps, the element pad, the circuit pad and the conductive film are preferably made of the same conductive material.

It is desired to fabricate, on the protective layer, a bonding pad to be electrically connected to the bump. In this case, the contact area of a monitoring instrument for the processing degree can be enlarged. The bonding pad is preferably elongated to the area of the electrical circuit on the protective layer. In this case, since the terminal of the monitoring instrument can be disposed on the elongated portion of the bonding pad, the damage of the electrode portion of the bonding pad near the bump can be inhibited.

Also, the bonding pad is preferably narrowed in between the thin film magnetic head assembly and the electrical circuit. In this case, when the electrical circuit area is cut off, to complete a given thin film magnetic head, short-circuit can be inhibited in the thin film magnetic head.

In the wafer structure of the present invention, it is desired that the electrical circuit is made as an electrical lap-guiding element. Also, it is desired that the thin film magnetic head assembly includes the reading head element, and the polishing degree of the reading head element is monitored by the electrical lap-guiding element. In this case, the polishing degree of the reading element can be monitored by an external monitoring system through the electrical lap-guiding element.

BRIEF DESCRIPTION OF THE DRAWINGS

For a better understanding of this invention, reference is made to the attached drawings, wherein:

FIG. 5 is a plan view showing a wafer structure at polishing using lap-guiding elements.

DETAILED DESCRIPTION OF PREFERRED EMBODIMENTS

Figure 1:
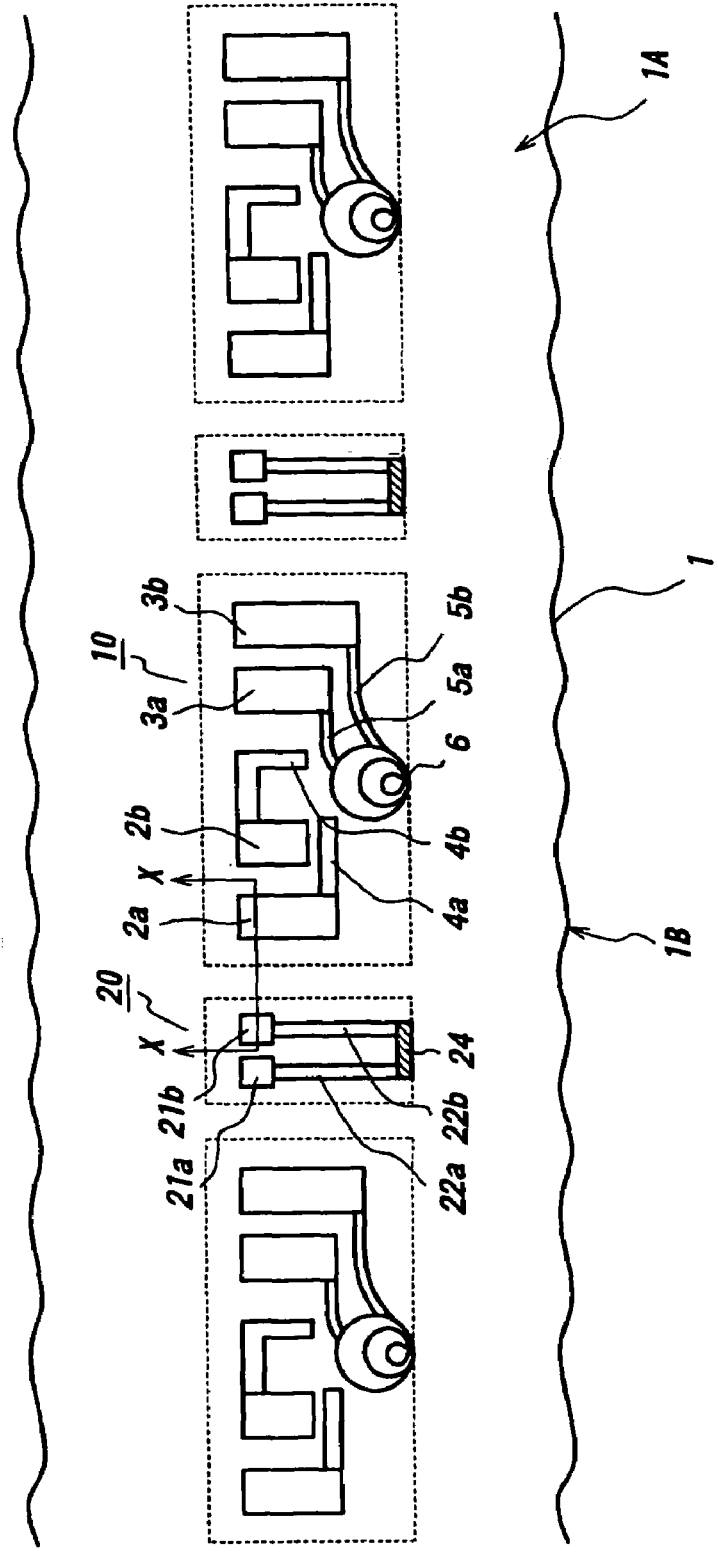
FIG. 1 is a plan view showing a conventional wafer structure.
Figure 2:
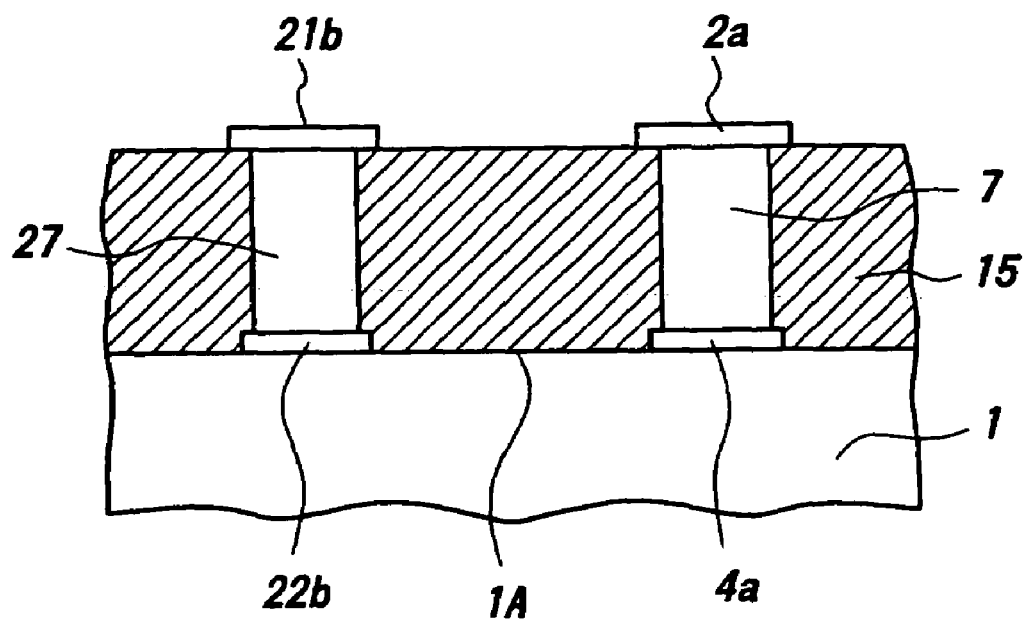
FIG. 2 is a cross sectional view of a portion of the wafer structure of FIG. 1, taken on line X—X.
Figure 3:
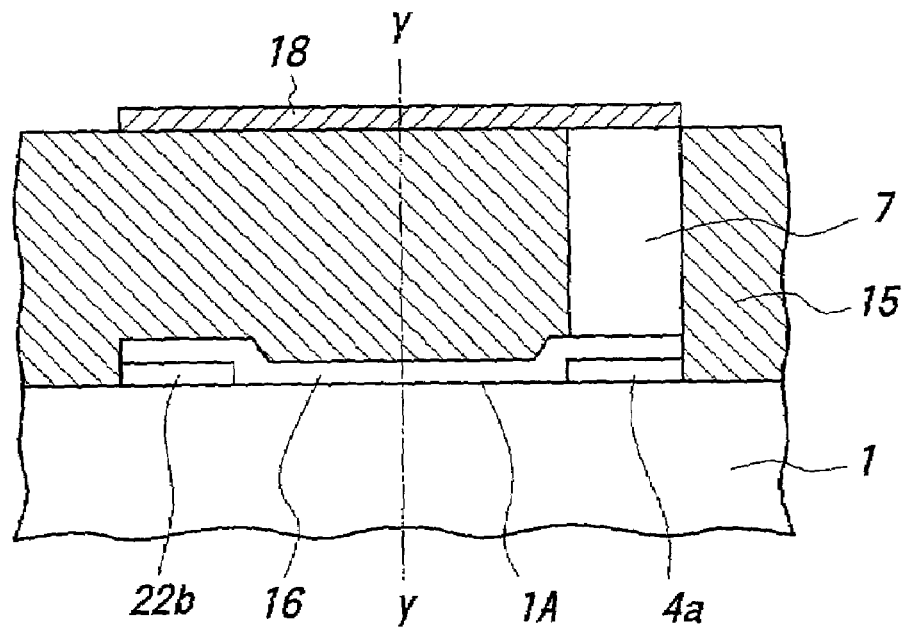
FIG. 3 is a cross sectional view showing a portion of a wafer structure according to the present invention.

This invention will be described in detail, with reference to figures, hereinafter. FIG. 3 is a cross sectional view showing a portion of a wafer structure according to the present invention. Similar to FIGS. 1 and 2, FIG. 3 shows the state where a thin film magnetic head assembly 10 and an electrical lap-guiding element (often called as a "lap-guiding element") 20 as an electrical circuit are provided. The same reference numerals are given to the similar portions to the ones in FIGS. 1 and 2. For clarifying the characteristics of the present invention, the wafer structure depicted is different from a real one.

In the wafer structure shown in FIG. 3 according to the present invention, a leading wire 22b for the lap-guiding element 20 and a leading wire 4a for the thin film magnetic head assembly 10 are electrically connected by a conductive film 16. Then, an element bump 7 is fabricated so as to penetrate a protective film 15 and be contacted with the conductive film 16 above the leading wire 4a. Therefore, the element bump 7 is electrically connected with the leading wires 4a and 22b.

In this case, the leading wires 4a and 22b are electrically connected with the conductive film 16 certainly. Although the leading wires 4a and 22b may be electrically connected with another wire, the contact condition is not good. The leading wire 4a functions as an element leading wire for the thin film magnetic head, and the leading wire 22b functions as a circuit leading wire for the lap-guiding element.

The conductive film is preferably made by a sputtering method or a plating method. In this case, the dimension of the conductive film can be freely defined.

Moreover, the conductive film 16 is made of the same material as that of the leading wires 4a and 22b. In this case, the fabricating steps of the wafer structure can be reduced. Also, since the ohmic contact between the conductive film 16 and the leading wires 4a; 22b can be developed, a given monitoring information can be obtained precisely from the element bump 7 via the leading wire 22b and the conductive film 16.

In addition, if the leading wire 4a is connected with a MR element of the complete thin film magnetic head, as shown in FIG. 1, a given electrical current can be supplied to the MR element via the leading wire 4a without current loss.

The conductive film 16 may be made of a conductive material such as Rh, Al, Ta, Au, Ag, Cu, Fe, Ni or an alloy composed of two or over of these metals.

In FIG. 3, a bonding pad 18 made of Au or the like is fabricated on the protective layer 15 so as to be electrically connected to the element bump 7. Since the area of the bonding pad is set larger than the top surface area of the element bump 7, a given external circuit can be contacted precisely via the bonding pad 18 when a processing degree is monitored by the lap-guiding element 20 or a given information is read out from a MR element of the complete thin film magnetic head.

As shown in FIG. 3, the bonding pad 18 is preferably elongated to the leading wire 22b, that is, the electrical circuit area on the protective layer 15.

The portion of the bonding pad 18 near the element bump 7 functions as an electrode terminal to read out information from a MR element of the complete thin film magnetic head, as mentioned above.

If a given terminal is electrically connected to the portion of the bonding pad 18 near the element bump 7 in order to monitor the information of the processing degree by the lap-guiding element, the portion of the bonding pad 18 may be damaged. That is, the electrode terminal of the thin film magnetic head is damaged, and thus, the complete thin film magnetic head may be also damaged structurally.

On the other hand, as shown in FIG. 3, if the bonding pad 18 is elongated to the electrical circuit area on the protective film 15, a given terminal can be connected to the elongated portion of the bonding pad 18. Therefore, the information of the processing degree can be monitored without the damage of the portion of the bonding pad 18 near the element bump 7 which corresponds to the electrode terminal of the complete thin film magnetic head. Since the portion of a wafer 1 on which the electric circuit area is fabricated is cut off along the line Y—Y and disposed, the complete thin film magnetic head is not damaged even though the elongated portion of the bonding pad 18 is damaged.

Figure 4:
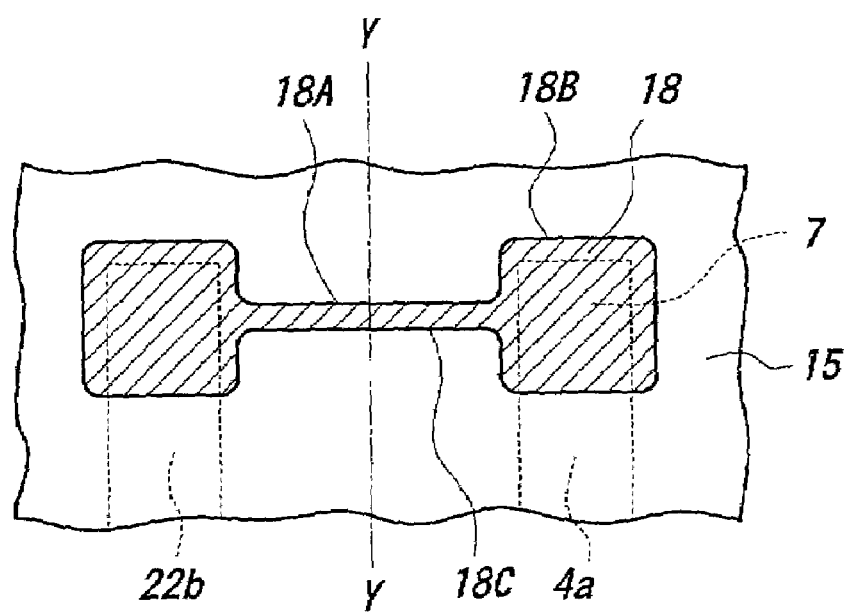
FIG. 4 is a plan view of the portion of the wafer structure of FIG. 3.

FIG. 4 is a plan view of the portion of the wafer structure of FIG. 3. In FIG. 4, the bonding pad 18 includes the narrowed portions 18A and 18C between the leading wires 4a and 22b, that is, between the thin film magnetic assembly and the electrical circuit.

As mentioned above, the thin film magnetic assembly and the electrical circuit is cut off along the line Y—Y, and thus, divided. The bonding pad 18B in the right side of the line Y—Y functions as an electrode terminal to read out information of a given MR element.

Since the elongated portion 18C of the bonding pad 18 is a dispensable portion in the complete thin film magnetic head, it is desired that the elongated portion 18c is narrowed so as not to generate short-circuit, as mentioned above.

FIG. 5 is a plan view showing a wafer structure at polishing using lap-guiding elements. In this case, the thin film magnetic head assembly 10 is polished in order to form the ABS with monitoring the polishing degree, that is, the MR height, by using the lap-guiding element 20.

The leading wire 22b of the lap-guiding element 20 and the leading wire 4a of one thin film magnetic head assembly 10 placed in the right side are electrically connected with one conductive film 16. Then, the leading wire 22a of the lap-guiding element 20 and the leading wire 5b of another thin film magnetic head assembly 10 placed in the left side are electrically connected with another conductive film 16. Then, the bonding pad 18 is elongated between the thin film magnetic head assembly 10 and the lap-guiding element 20.

The thin film magnetic assembly 10 is polished so as to form the ABS of the complete thin film magnetic head as follows. First of all, terminals of a monitoring instrument are connected to the elongated portions 18D of the bonding pad 18 in the lap-guiding element 20 so as not to damage the electrode portion of the bonding pad 18 near the thin film magnetic head assembly 10, and a given electrical current is flown between the terminals. The electrical current is flown through the resistive film 24 of the lap-guiding element 20 via the leading wires 22a and 22b.

When the resistive film 24 is polished and thus, the resistance is changed, the current value between the elongated portions 18D of the bonding pads 18 is also changed. Therefore, the polishing degree, that is, of the end surface 1 of the wafer 1 can be monitored indirectly by measuring the change of the current value. As a result, the MR height of the complete thin film magnetic head can be defined precisely.

Although the present invention was described in detail with reference to the above examples, this invention is not limited to the above disclosure and every kind of variation and modification may be made without departing from the scope of the present invention. For example, another electrical circuit such as an electrostatic destruction—resistance circuit or an electrostatic withstand voltage-measuring circuit may be fabricated as the electrical circuit, instead of the lap-guiding element.

Moreover, a plurality of lap-guiding elements are fabricated on the trailing surface 1B so that the forefronts of the elements are shifted in turn by a given distance, and thus, the changes in resistance and the electrical disconnections of the lap-guiding elements may be monitored. In this case, the polishing degree of the end surface 1B of the wafer 1 can be precisely polished and thus, the ABS of the complete thin film magnetic head can be precisely defined.

As mentioned above, according to the present invention, a circuit bump may not be fabricated in an electrical circuit area. Therefore, even through thin film magnetic head assemblies and electrical circuits for monitoring are fabricated in high density on a single wafer to satisfy the requirement of high recording density, the short-circuit between each thin film magnetic head assembly and each electrical circuit which are fabricated adjacently can be inhibited because the corresponding circuit bump and the corresponding element bump are not contacted. Similarly, even though the space between each circuit bump and each element bump is narrowed, the creation of some cracks and chirping can be inhibited between the corresponding thin film magnetic head assembly and the corresponding electrical circuit. Therefore, the creation of defect can be inhibited in the thin film magnetic head assembly, and thus, the yielding ratio in manufacture of the resulting thin film magnetic head can be enhanced.

What is claimed is:

1. A method for fabricating a thin film magnetic head, comprising the steps of:
   fabricating a thin film magnetic head assembly on a given substrate,
   fabricating, on said substrate, an electrical circuit including a circuit leading wire so as to monitor the processing degree of said thin film magnetic head assembly,
   forming a protective layer so as to cover said thin film magnetic head assembly and said electrical circuit,
   fabricating, on said substrate, a bump so as to penetrate said protective layer and thus, to be exposed,
   fabricating, directly on said substrate, an element leading wire to be electrically connected to said thin film magnetic head assembly, and
   electrically connecting said element leading wire and said circuit leading wire,
   whereby said bump is shared with said thin film magnetic head assembly and said electrical circuit, and the processing degree of said thin film magnetic head assembly is indirectly monitored by an external monitoring system on the monitoring information from said electrical circuit to said external monitoring system via said bump.

2. A fabricating method as defined in claim 1, further comprising the step of forming a conductive film to electrically connect said element leading wire and said circuit leading wire.

3. A fabricating method as defined in claim 2, wherein said conductive film is made by a sputtering method or a plating method.

4. A fabricating method as defined in claim 2, wherein said element leading wire, said circuit leading wire and said conductive film are made of the same conductive material.

5. A fabricating method as defined in claim 1, further comprising the step of fabricating a bonding pad on said protective layer so as to be electrically connected with said bump.

6. A fabricating method as defined in claim 5, wherein said bonding pad is elongated, on said protective layer, to the area of said electrical circuit.

7. A fabricating method as defined in claim 6, wherein said bonding pad is narrowed in the area between said thin film magnetic head assembly and said electrical circuit.

8. A fabricating method as defined in claim 1, wherein said electrical circuit is constructed of an electrical lap-guiding element.

9. A fabricating method as defined in claim 8, wherein said thin film magnetic head assembly includes a reading head element, and the polishing degree of said reading head element is monitored by said electrical lap-guiding element.

10. A wafer structure comprising:
    a thin film magnetic head assembly which is fabricated on a given substrate,
    an electrical circuit including a circuit leading wire so as to monitor the processing degree of said thin film magnetic head assembly, which is fabricated on said substrate,
    a protective layer so as to cover said thin film magnetic head assembly and said electrical circuit,
    a bump so as to penetrate said protective layer and thus, to be exposed, which is fabricated on said substrate, and
    an element leading wire to be electrically connected to said thin film magnetic head element to be connected to an external circuit, which is fabricated on said substrate
    said element leading wire being electrically connected with said circuit leading wire,
    said bump is shared with said thin film magnetic head assembly and said electrical circuit;
    wherein the element leading wire is in direct contact with the substrate.

11. A wafer structure as defined in claim 10, further comprising a conductive film to electrically connect said element leading wire and said circuit leading wire.

12. A wafer structure as defined in claim 11, wherein said conductive film is made by a sputtering method or a plating method.

13. A wafer structure as defined in claim 12, wherein said element leading wire, said circuit leading wire and said conductive film are made of the same conductive material.

14. A wafer structure as defined in claim 10, further comprising a bonding pad on said protective layer so as to be electrically connected with said bump.

15. A wafer structure as defined in claim 14, wherein said bonding pad is elongated, on said protective layer, to the area of said electrical circuit.

16. A wafer structure as defined in claim 15, wherein said bonding pad is narrowed in the area between said thin film magnetic head assembly and said electrical circuit.

17. A wafer structure as defined in claim 10, wherein said electrical circuit is constructed of an electrical lap-guiding element.

18. A wafer structure as defined in claim 17, wherein said thin film magnetic head assembly includes a reading head element, and the polishing degree of said reading head element is monitored by said electrical lap-guiding element.

* * * * *